(12) United States Patent
Sakamoto

(10) Patent No.: US 6,477,918 B2
(45) Date of Patent: Nov. 12, 2002

(54) ROTARY ELECTRIC MACHINE HAVING COAXIAL OUTPUT HOLLOW SHAFT WITH REDUCTION GEAR AND SLIP RING

(75) Inventor: Masafumi Sakamoto, Kiryu (JP)

(73) Assignee: Japan Servo Co., Ltd., Tokyo-to (JP)

( * ) Notice: Subject to any disclaimer, the term of this patent is extended or adjusted under 35 U.S.C. 154(b) by 0 days.

(21) Appl. No.: 09/826,899

(22) Filed: Apr. 6, 2001

(65) Prior Publication Data

US 2001/0052735 A1 Dec. 20, 2001

(30) Foreign Application Priority Data

Apr. 7, 2000 (JP) .................................... 2000-106796

(51) Int. Cl.⁷ .............................................. F16H 49/00
(52) U.S. Cl. ........................................ 74/640; 475/149
(58) Field of Search ............................. 74/640; 475/149

(56) References Cited

U.S. PATENT DOCUMENTS

| | | | |
|---|---|---|---|
| 3,986,412 A | * 10/1976 | Farley | 475/5 |
| 4,518,308 A | * 5/1985 | Grzybowski et al. | 74/640 |
| 4,644,845 A | * 2/1987 | Garehime, Jr. | 89/41.05 |
| 4,990,839 A | * 2/1991 | Schonlau | 700/248 |
| 5,293,107 A | * 3/1994 | Akeel | 318/568.11 |
| 5,704,864 A | * 1/1998 | Yanagisawa | 475/149 |
| 5,976,047 A | * 11/1999 | Woytaszek | 475/149 |

FOREIGN PATENT DOCUMENTS

JP    2000077150    3/2000

\* cited by examiner

*Primary Examiner*—Sherry Estremsky
(74) *Attorney, Agent, or Firm*—Oblon, Spivak, McClelland, Maier & Neustadt, P.C.

(57) ABSTRACT

For driving an actuator which is optimum for and practical in use as a three-dimensionally positioning apparatus for a monitoring camera, a disco-lighting, an antenna, a multi-axis (multi-articular) robot, etc., an inner rotor type rotary electric machine is provided having a coaxial output hollow shaft with a reduction gear and a slip ring, including a hollow rotation shaft; a reduction gear for reducing an output of the inner rotor type rotary electric machine and extracting an output through a hollow shaft of the reduction gear coaxially with the hollow rotation shaft; and a slip ring provided in a hollow portion or an output portion of the reduction gear. Instead of the inner rotor type rotary electric machine, a similar outer rotor type rotary electric machine may be used.

9 Claims, 4 Drawing Sheets

ROTARY ELECTRIC MACHINE HAVING COAXIAL OUTPUT HOLLOW SHAFT WITH REDUCTION GEAR AND SLIP RING

BACKGROUND OF THE INVENTION

The present invention relates to an actuator suitable for an apparatus popularly known as a "universal head", mainly for three-dimensionally positioning of a monitoring camera, a disco-lighting unit, an antenna drive unit, a (multi-axis multi-articular) robot, or the like, particularly to a rotary electric machine having a coaxial output hollow shaft with a reduction gear and a slip ring.

In such an apparatus called a universal head mainly for three-dimensionally positioning a monitoring camera, a disco-lighting unit, an antenna drive unit, a multi-axis (multi-articular) robot, or the like, a panning (horizontally rotating) motor and a tilting (vertically rotating) motor are used for three-dimensional positioning by an actuator. Usually the tilting motor is horizontally rotated by the panning motor, and a camera or a light attached to the tilting motor is positioned in a desired three-dimensional position.

According to the configuration of such a three-dimensionally positioning apparatus in the related art, power supply lead wires for the tilting motor or power supply cables for the camera or the light may be twisted or the camera or the light cannot be rotated continuously when the camera or the light is driven. Thus, for example, there is a demerit in that the camera or the light cannot be moved and rotated over a limited angle of about 300°.

Therefore, the present inventor has filed an application for a patent titled "Direct Drive Electric Motor Apparatus Incorporating Slip Ring Assembly" as Japanese Patent Application No. 284695/1998, and thereafter submitted a translated document. A description is set forth below about this related-art direct drive apparatus with reference to FIG. 3.

A television camera apparatus 101 shown in FIG. 3 is constituted by a well-known dome-shaped camera enclosure 103 used in a monitoring system; a transparent or semi-transparent dome 103A; a base plate 104 which is fixedly attached to the upper portion of the camera enclosure 103; a panning motor 102 which is fixedly attached to the surface of the base plate 104; a camera holder bracket 107 attached to a rotor 114 of the panning motor 102 disposed so as to be rotatable around the horizontal axis H (pan) which extends through the center of the base plate 104 and which is orthogonal to the base plate 104; and a tilting motor 110 fixedly mounted on one side of the camera holder bracket 107 which is formed as an inverted U-shaped fork-like holder.

A television camera 112 is attached to a rotor 116 of the tilting motor 110, so that the camera 112 is mounted so as to be rotatable around the vertical axis V (i.e. tilt axis). On the opposite side, the camera 112 is mounted on the camera holder bracket 107 via a well known pivotally rotating joint 115 extended along the V axis.

The V axis (tilting axis) which is orthogonal to the H axis (panning axis), the L axis (lens) which is orthogonal to the V axis (tilt), and the H axis (panning axis) are made to intersect each other at the center of the dome-shaped cover portion 103A so as to provide the all-round unobstructed panning and tilting movement within the dome sphere.

The panning motor 102 incorporates rotary contacts or a slip ring assembly 106 inside its rotor 114.

The slip ring assembly 106 per se is a known assembly constituted by a rotating conductive metal ring, and a complementarily mounted conductive metal brush that applies pressure to the metal ring for holding a continuous current flow through the metal ring during the rotation of the metal ring.

Connecting wires 105 include wires for feeding power and control signals to the camera and wires for receiving a video signal, an audio signal and data signals from the camera. The connecting wires 105 pass through an opening in the domed closure or case 103 and the base plate 104 for connecting the rotating ring of the slip ring assembly 106.

Wires 113 for feeding power to the panning motor 102 may be fed through a separate opening 113A directly to the panning motor 102 if the panning motor 102 is an inner rotor type, or the wires 113 should be connected to the panning motor 102 along with the connecting wires 105 if the panning motor 102 is an outer rotor type.

Wires 108 connected at their one ends to the brush of the slip ring assembly 106 are fed through an opening in the holder bracket 107 and are connected at their other ends to the rotating ring of a slip ring assembly 109 mounted on a portion inside the shaft of the rotor 116 of the tilting motor 110. Wires 111 connected at their one ends to the brushes of the slip ring assembly 109 are connected at their other ends to the camera 112 and to a control circuit (not shown).

It is obvious from FIG. 3 that, in this arrangement, the camera can rotate endlessly around its panning H axis or its tilting V axis without causing the wires to flex or twist.

Furthermore, it is obvious that the camera holder bracket 107, which is mounted directly onto the rotor 114 of the panning motor 102, is directly driven by the drive motor without any power transmission mechanism.

Similarly, it is obvious from FIG. 3 that the rotor 116 of the tilting motor 110 can directly drive the camera tilting position without using any power transmission mechanism.

The elimination of the power transmission mechanism and assemblies reduces the size of the dome-shaped camera enclosure 103, simplifies the configuration, improves the efficiency and accuracy of the positioning device, and also improves the reliability.

Incidentally, specific configurations of the panning motor 102 and the tilting motor 110 are shown in detail in the specification and translated document of Japanese Patent Application No. 284695/1998 which is an application according to the above-mentioned related art.

As a result of investigation carried out after filing the application of the above-mentioned related art, however, it was found that there was a problem when a stepping motor suitable for positioning was used as the motor for direct driving without using any reduction gear. That is, it was difficult to start up if load inertia was large. Therefore, a large motor was required, so that the apparatus became unfavorably high in price and large in size in spite of no reduction gear.

SUMMARY OF THE INVENTION

It is therefore an object of the present invention to solve the foregoing problem, and to provide a rotary electric machine having a coaxial output hollow shaft with a reduction gear and a slip ring, which constitute an actuator optimum for and practical in use as a three-dimensionally positioning apparatus for a monitoring camera, a disco-lighting, an antenna, etc.

In order to attain the above object, according to a first aspect of the present invention, that is as defined in claim 1, there is provided an inner rotor type rotary electric machine having a coaxial output hollow shaft with a reduction gear and a slip ring, comprising: a hollow rotation shaft; a reduction gear for reducing an output of the inner rotor type rotary electric machine and extracting an output through a hollow shaft of the reduction gear coaxially with the hollow rotation shaft; and a slip ring provided in a hollow portion or an output portion of the reduction gear.

According to a second aspect of the present invention, that is as defined in claim 2, there is provided an outer rotor type rotary electric machine having a coaxial output hollow shaft with a reduction gear and a slip ring, comprising: a hollow rotation shaft; a reduction gear for reducing an output of the outer rotor type rotary electric machine and extracting an output through a hollow shaft of the reduction gear coaxially with the hollow rotation shaft; and a slip ring provided in a hollow portion or an output portion of the reduction gear.

According to the above-mentioned first or second aspect of the present invention, the rotary electric machine is a stepping motor.

According to the above-mentioned first or second aspect of the present invention, at least one of a position sensor and a speed sensor is provided in the hollow portion or the output portion of the reduction gear along with the slip ring.

According to a third aspect of the present invention, there is provided a driving device for performing three-dimensional positioning, comprising: a rotary electric machine having a coaxial output hollow shaft with a reduction gear and a slip ring; and means for performing giving and receiving electric power through the slip ring so that the driving device is driven.

According to the first or second aspect of the present invention, preferably, the reduction gear is a harmonic reduction gear constituted by an output gear which has internal gear teeth and an inner gear which is made of a flexible material and in gear with the output gear, the inner gear having gear teeth on an outer circumference thereof, the number of the gear teeth of the inner gear being set so as to be smaller than the internal gear teeth, an inner circumference of the inner gear being forced to form an ellipse so that the inner circumference of the inner gear is drawn by a longer axis of the ellipse to make the gear teeth of the inner gear comes to be in gear with the gear teeth of the output gear.

According to a fourth aspect of the present invention, there is provided a multi-axis positioning device which comprises: at least one rotary electric machine and means for performing giving and receiving electric power through the slip ring so that the multi-axis positioning device is driven. In this case, another panning motor is attached to an output portion of a panning motor to perform multi-axis positioning. In this case, a horizontally moving multi-axis is realized in which a tilting motor is not always required. That is, there is provided a two dimensional positioning.

In such a configuration, load inertia J, which is converted into the motor rotation axis, can be reduced to:

$$J=JL/N^2$$

where N designates the reduction ratio and JL designates the load inertia before conversion.

In addition, because the reduction gear is a coaxial type, a hollow portion can be provided at the center of the reduction gear coaxially with the hollow rotation shaft of the motor. Accordingly, if a slip ring is provided in a reduced final output portion, power can be supplied from the static side of a non-output-side center hole of the motor or the like, so that the output of the slip ring can make motion uniform with the reduction gear output portion. As a result, there is no fear that the lead wires of the tilting motor or the like are twisted as described above. Thus, every rotating portion can make continuous forward rotation or continuous backward rotation over 360°.

DETAILED DESCRIPTION OF THE PREFERRED EMBODIMENTS

First and second embodiments of a rotary electric machine having a coaxial output hollow shaft with a reduction gear and a slip ring according to the present invention (hereinafter, sometimes referred to as a "rotary electric machine" simply) will be described below with reference to FIGS. 1A, 1B and 1C and FIGS. 2A and. 2B.

First Embodiment

First, the configuration of the first embodiment of the rotary electric machine according to the present invention will be described with reference to FIGS. 1A and 1B.

Figure 1A:
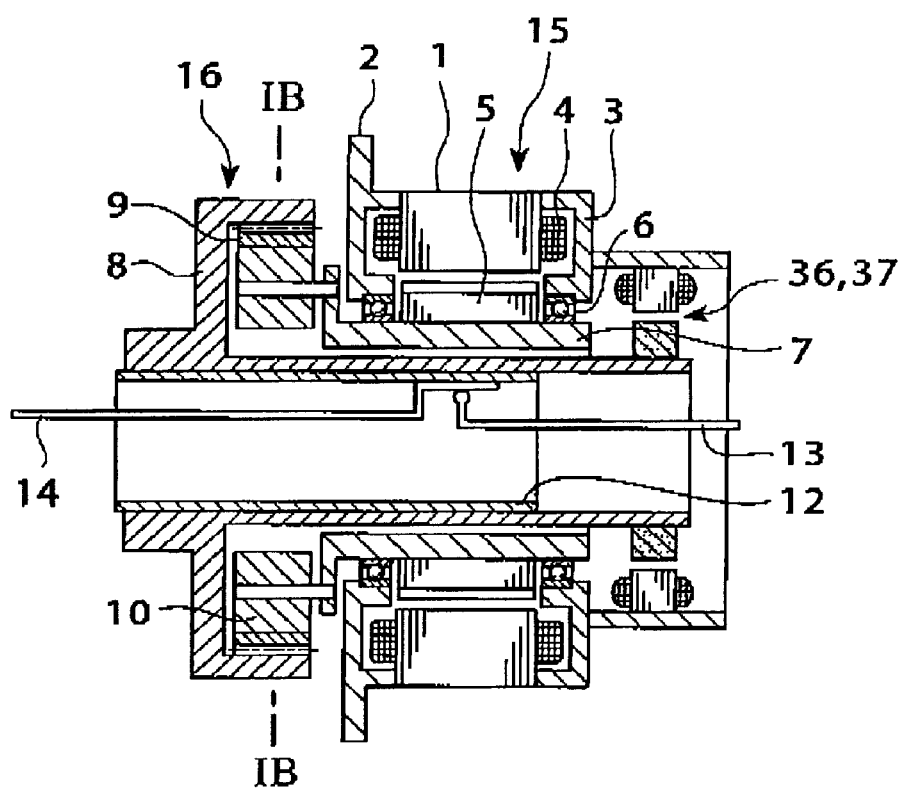
FIGS. 1A and 1C are views showing the configuration of a first embodiment and a modification of an inner rotor type motor according to the present invention, each of FIGS. 1A and 1C being a partially longitudinally sectioned side view, FIG. 1B being a concept view showing a main part of the radial section along line IB—IB in each of FIGS. 1A and 1C.
Figure 1B:
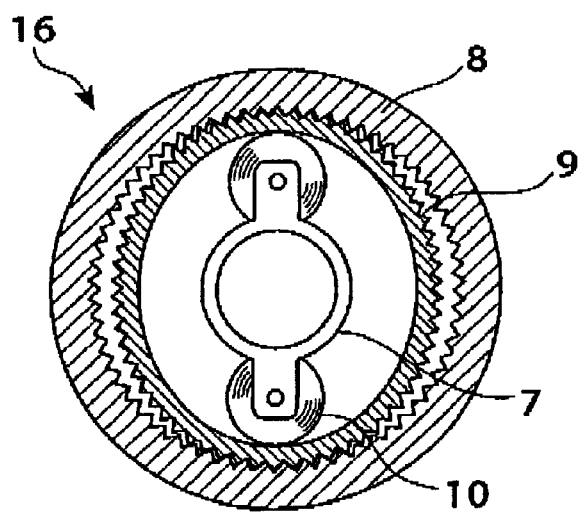

FIGS. 1A and 1B are views showing the configuration of the first embodiment of an inner rotor type motor 15 as a rotary electric machine according to the present invention. Specifically, FIG. 1A is a partially longitudinally sectioned side view and FIG. 1B is a concept view showing a main part of the radial section along line IB—IB in FIG. 1A.

As shown in FIG. 1A, the inner rotor type motor 15 in this embodiment has a motor stator 1, an output-side bracket 2, a rear-side bracket 3, a motor coil 4, a rotor 5, a bearing 6, a hollow motor rotation shaft 7, and a reduction gear 16 having a hollow shaft for extracting an output coaxially with the hollow motor rotation shaft 7.

In FIG. 1B, a harmonic reduction gear which can ensure a large reduction gear ratio is illustrated, by way of example, as the reduction gear 16. This reduction gear 16 according to the present invention has the merit that a reduced output required for the inner rotor type motor 15 can be extracted from a position coaxial with the motor rotor 5 while the backlash is smaller. In FIG. 1B, an output gear 8 is called a circular spline and has an internal gear, and an inner gear 9 (i.e. a flex spline) made of a flexible material. The number of teeth of the inner gear 9 is little smaller than that of internal gear of the output gear. This inner gear 9 is drawn from its inner side by rollers 10 referred to as a wave generator. Thus, the harmonic reduction gear 16 is formed so that a large reduction ratio can be obtained by a slight difference in the number of teeth between the output gear 8 and the inner gear 9. Further, this reduction gear has an advantage in that back-lash is substantially zero.

In FIG. 1A, a housing 12 for a slip ring is fixedly attached to the hollow inner-diameter side of the output gear 8. A slip ring 14 made of conductive metal or the like and a brush 13 made of conductive metal or the like are configured so that the brush 13 and the slip ring 14 rotate while they are in slidable contact with each other. In such a manner, a current is allowed to flow continuously between the brush 13 and the slip ring 14.

The slip ring 14 is attached to the hollow portion, that is, on an inner surface of housing 12 of the reduction gear 16, and, more particularly, the inner surface of the housing 12, as shown in FIG. 1A. In this case, the output gear 8 and the slip ring 14 perform uniform motion. Accordingly, if a tilting motor is attached to the output gear 8 and the lead wires of the tilting motor are connected with the slip ring 14, the tilting motor can rotate continuously, while the lead wires are not twisted with each other.

Figure 1C:
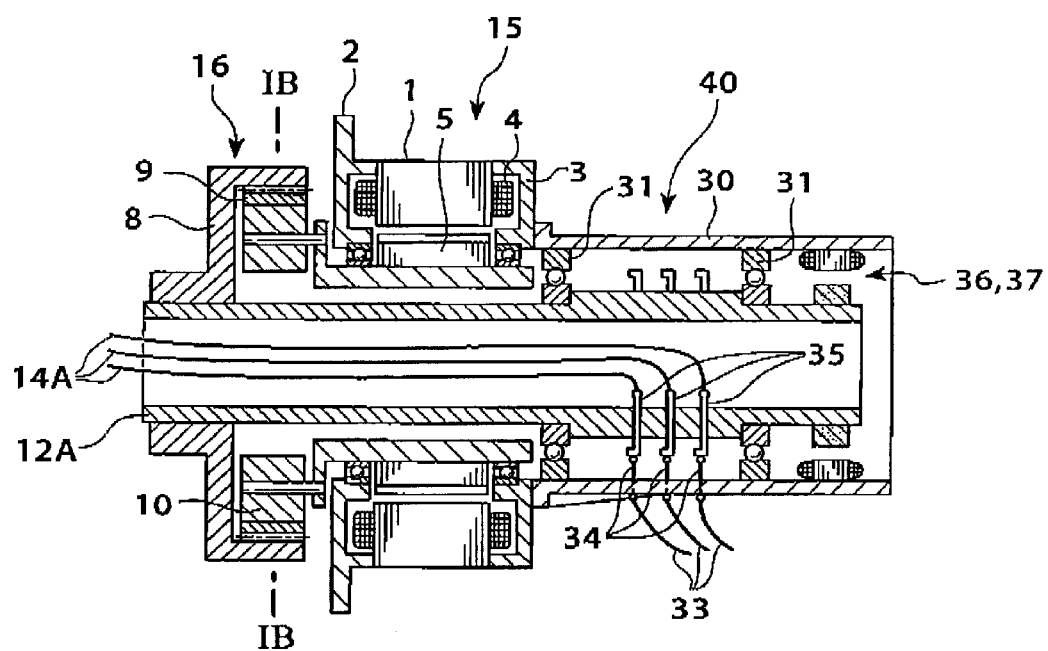

FIG. 1C is a partial modification of FIG. 1A and shows a rotary electric machine according to the present invention, in which a slip ring assembly 40 is provided on an output portion. In this case, the "output portion" means the output gear 8. The slip ring assembly 40 is constituted by a housing 30, bearings 31, feed wires 33, contactors 34, conductive rings 35, lead wires 14A, and a rotary ring 12A. The slip ring assembly 40 is connected to the output gear 8. More specifically, the rotary ring 12A is fixed to the output gear 8, the housing 30 is fixed to the rear-side bracket 3, the contactors 34 are fixed to the housing 30, and the conductive rings 35 are fixed to the rotary ring 12A. The contactors 34 can slip on the conductive rings 35, so that the output gear 8, the rotary ring 12A and the lead wires 14A are rotated integrally with each other. The electric power fed to the feed wires 33 is fed to the necessary portion through the contactors 34, the conductive rings 35 and lead wires 14A of the slip ring assembly 40.

Second Embodiment

Next, the configuration of the second embodiment of the rotary electric machine according to the present invention will be described with reference to FIGS. 2A and 2B.

Figure 2A:
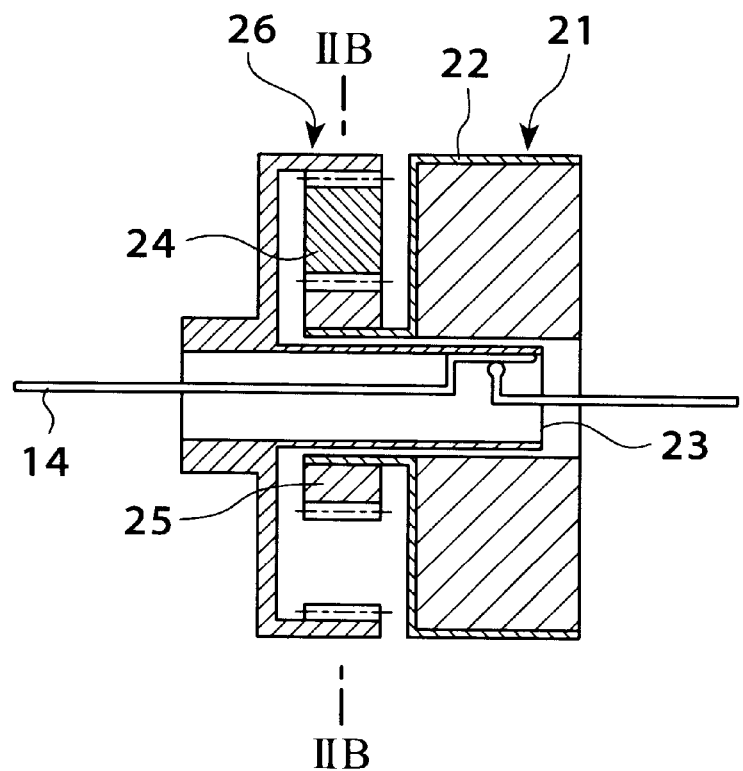
FIGS. 2A and 2B are views showing the configuration of a second embodiment of an outer rotor type motor according to the present invention, FIG. 2A being a partially longitudinally sectioned side view, FIG. 2B being a concept view showing a main part of the radial section along line IIB—IIB in FIG. 2A.
Figure 2B:
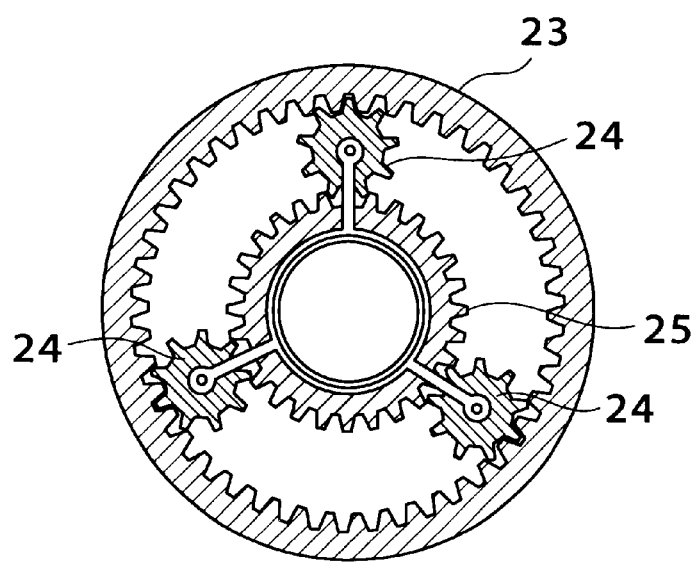
Figure 3:
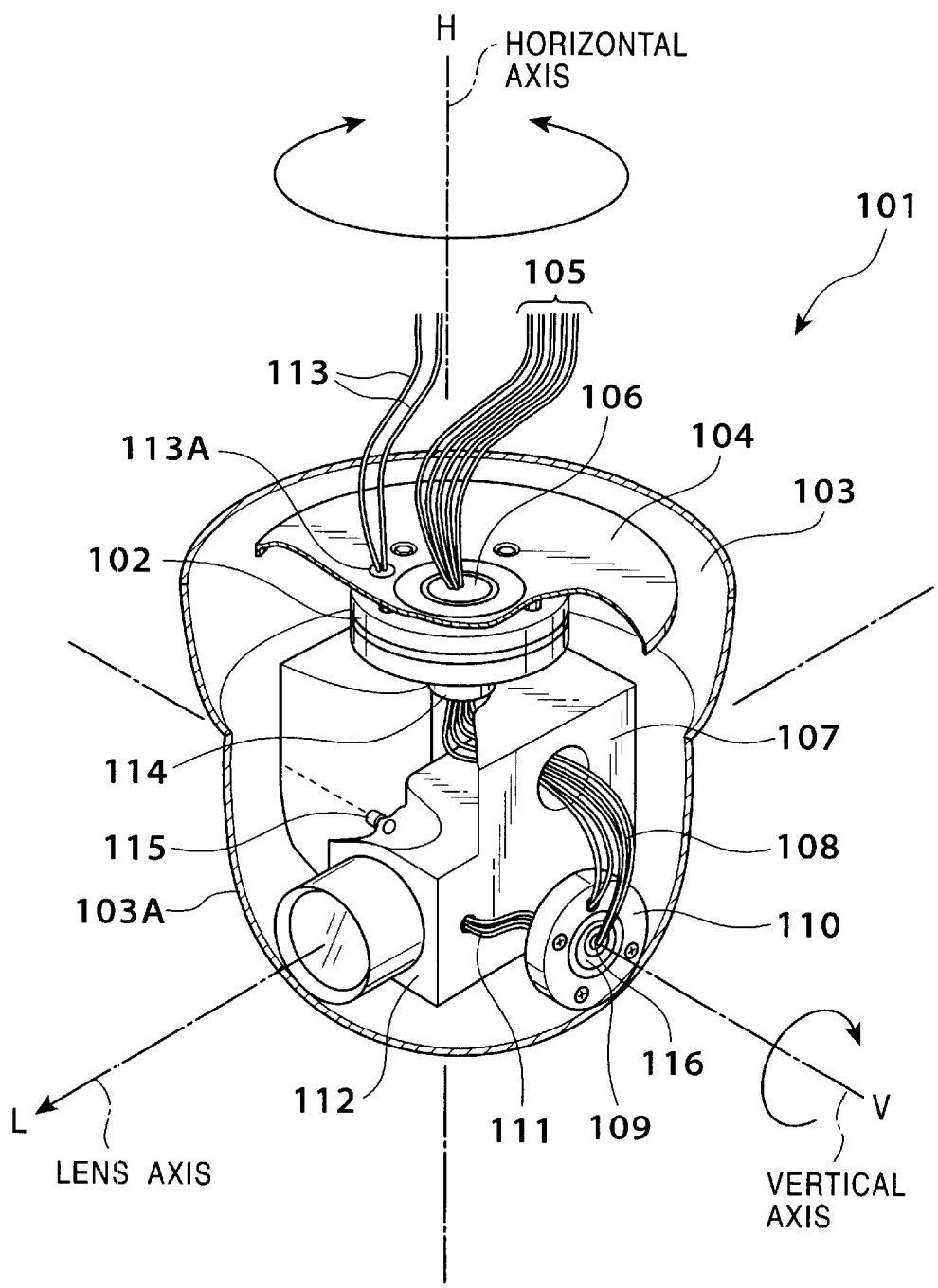
FIG. 3 is a partially cut-away perspective view which can be also applied to the present invention and which shows an external configuration of a television camera apparatus having a conventional rotary electric machine.

FIGS. 2A and 2B are views showing the configuration of the second embodiment of an outer rotor type motor. FIG. 2A is a partially longitudinally sectioned side view and FIG. 2B is a concept view showing a main part of the radial section along line IIB—IIB in FIG. 2A. Reference numeral 21 represents an outer rotor type motor, the internal configuration of which is not illustrated. Reference numeral 22 represents a transmission shaft for supplying the motor output to a reduction gear 26. The reduction gear 26 reduces the output of the outer rotor type motor 21, and the output of the reduction gear 26 is extracted from its hollow shaft which is coaxial with the transmission shaft 22.

In FIGS. 2A and 2B, the reduction gear 26 is illustrated as having planet gears by way of example. The reduction gear 26 is constituted by an internally toothed gear 23, planet gears 24, and a sun gear 25 connected to the transmission shaft 22. The planet gears constituting the reduction gear 26 in this embodiment provide a similar merit to that in the first embodiment.

The output portion of the internally toothed gear 23 is made hollow. Similarly to the internally toothed gear shown in FIGS. 1A and 1B, a slip ring 14 is incorporated in the gear 23. Incidentally, as the planet gears 24, generally, three planet gears are used at every angle of 120°.

A rotary electric machine having a coaxial output hollow shaft with a reduction gear and a slip ring according to the present invention is not limited to the above-mentioned embodiments, but may be modified variously.

For example, the reduction gear applied to the rotary electric machine according to the present invention is not limited to those shown in FIGS. 1A and 1B and FIGS. 2A and 2B, but any reduction gear may be used so long as the output of the reduction gear is coaxial with the rotation shaft. For example, a reduction gear in which gears are meshed with each other differentially in the axial direction may be used.

For positioning, a stepping motor may be used in an open loop economically. In this case, however, there is a demerit in that the motor cannot start up or is apt to step out if the inertia load of the motor is large. Conventionally, therefore, a brushless DC motor having an encoder attached thereto was used in a closed loop in the case of direct driving. Alternatively, a large-sized stepping motor might be used instead.

According to the present invention, the outer rotor type motor constituted by a small stepping motor and a simple coaxial type hollow shaft reduction gear can be used for direct driving.

When a usual rotor which is constituted by a second gear, a second pinion, a third gear, an output gear, or the like, is rotated, a reduced output portion is eccentric from the motor center. Accordingly, a common through hole cannot be provided in the motor portion and the reduction gear portion. Thus, even if a slip ring is incorporated, the function of the present invention cannot be obtained.

Incidentally, in the case where a stepping motor is used, generally, open loop control is employed. Therefore, it may be necessary to know the current position of the stepping motor particularly when the motor steps out.

Further, in the case of driving the motor with reduced low speed, it may be required to monitor fluctuations in rotating speed of the motor. In such a case, as described above, a suitable potentiometer or a suitable encoder may be used as a position sensor 36. Alternatively, a tachometer generator or the like may be used as a speed monitor 37.

(1) Since a slip ring is incorporated in the reduction gear having a hollow shaft, the lead wires of a secondary motor and the output of the slip ring after speed reduction become uniform speed with each other. Thus, the wires of the secondary motor or the like can be prevented from twisting so that the motor can be easily and continuously forward-rotated or backward-rotated. Thus, reliability is enhanced and the life of the rotary electric machine is prolonged.

(2) Since the reduction gear is used, the load inertia converted into the motor shaft can be reduced. Thus, a small-sized motor may be employed, and a stepping motor optimum for positioning may be used.

(3) Since the hollow shaft reduction gear coaxial with the motor is used, power can be supplied to the secondary motor through the slip ring even if the reduction gear is attached.

(4) When harmonic gears are used in the reduction gear, the reduction gear becomes an actuator in which the back-lash is substantially zero.

What is claimed is:

1. An inner rotor type rotary electric machine, comprising:
an inner rotor type motor having a stator and a rotor with a hollow rotation shaft which extends through a center hollow portion of said stator;
a reduction gear for reducing an output speed of said inner rotor type motor and extracting an output through a hollow shaft thereof coaxially with said hollow rotation shaft; and a slip ring assembly having a slip ring and a brush, wherein one of said slip ring and said brush is attached to one of a hollow portion of said rotor hollow rotation shaft and an output portion of said reduction gear, which comprises an extended portion of said hollow shaft over said inner rotor type motor, wherein a lead wire thereof extends through said hollow portion of said hollow shaft and the other of said slip ring and said brush is fixed to a non-rotational portion thereof.

2. An outer rotor type rotary electric machine having a coaxial output hollow shaft with a reduction gear and a slip ring, comprising:

an outer rotor type motor having a stator and a rotor with a hollow rotation shaft, said stator having a center hollow portion;

a reduction gear for reducing an output speed of said outer rotor type motor and extracting an output through a hollow shaft coaxially with said hollow rotation shaft; and a slip ring assembly having a slip ring and a brush, wherein one of said slip ring and said brush is attached to one of a hollow portion of said hollow shaft and an output portion of said reduction gear, which comprises an extended portion of said hollow shaft over said outer rotor type motor, wherein a lead wire thereof extends through the center hollow portion of said stator.

3. The rotary electric machine according to claims 1 or 2, wherein said motor comprises a stepping motor.

4. The rotary electric machine according to claims 1 or 2, wherein at least one of a position sensor and speed sensor is provided in one of said hollow portion and said output portion of said reduction gear along with said slip ring assembly.

5. A three-dimensional positioning device, comprising:

a rotary electric machine having a coaxial output hollow shaft with a reduction gear and a slip ring assembly as defined in claims 1 or 2, a driving device that is rotatable together with said coaxial hollow shaft, wherein said driving device transfers electric power from and receives electric power through said slip ring assembly.

6. A rotary electric machine according to claims 1 or 2, wherein said reduction gear comprises a harmonic reduction gear having an output gear which has internal gear teeth and an inner gear which is made of a flexible material and which is in gear with said output gear, said inner gear having gear teeth on an outer circumference thereof, the number of said gear teeth of said inner gear being set so as to be smaller than said internal gear teeth, an inner circumference of said inner gear forming an ellipse so that said inner circumference of said inner gear is deformed by a longer axis of said ellipse to make said gear teeth of said inner gear come into gear with said gear teeth of said output gear.

7. A multi-axis positioning device comprising: at least one rotary electric machine as defined in claims 1 or 2 and a driving device that is rotatable together with said hollow shaft of said reduction gear, wherein said driving device gives and receives electric power through said slip ring assembly.

8. The rotary electric machine according to claims 1 or 2, wherein said hollow rotating shaft of said motor has a pair of rollers, and wherein said reduction gear comprises an output gear which has internal gear teeth, an inner gear made of a flexible material and that is in gear with said output gear and wherein said rollers contact an inner portion of said inner gear.

9. The rotary electric machine according to claims 1 or 2, wherein said reduction gear comprises a sun gear, an internally toothed gear and a plurality of planet gears mounted within and engaging with said internally toothed gear.

* * * * *